Patented Mar. 6, 1951

2,543,801

UNITED STATES PATENT OFFICE 2,543,801

PROCESS FOR THE PREPARATION OF SHAPED POLYVINYL ALCOHOL OBJECTS

Gordon Derby Patterson and Henry Moroni Stark, Wilmington, Del., assignors to E. I. du Pont de Nemours & Company, Wilmington, Del., a corporation of Delaware No Drawing. Application May 20, 1948, Serial No. 28,276

10 Claims. (Cl. 260—41)

This invention relates to polymers, and more particularly to the preparation of compositions of insolubilized, water-soluble, polyvinyl alcohol containing colloidal alumina.

It is known that colloidal alumina can be used to mordant materials made of or containing cellulose esters or ethers, e. g., cellulose acetate, with improved dye fixation on these polymers. It is also known that colloidal alumina can be used for the precipitation of floating substances in solutions such as fats, starch, yeast albumen, and gelatinous substances. Insofar as is known, colloidal alumina has not been employed with water-soluble hydroxylated polymers such as a polyvinyl alcohol to render these polymers water insoluble.

This invention has as an object a process for insolubilizing polyvinyl alcohols. A further object is the preparation of water-insoluble shaped articles from water-soluble polyvinyl alcohols. Other objects include the preparation of films, filaments, coating compositions, adhesives and reinforcing binders from polyvinyl alcohols. Still other objects will appear hereinafter.

These objects are accomplished by the following invention wherein an aqueous solution of a water-soluble high molecular weight, i. e., macromolecular, polyvinyl alcohol is mixed with from 10–100% by weight, based on the polyvinyl alcohol, of alumina hydrate in colloidal dispersion, and the water is therefrom removed. The novel water-insoluble polyvinyl alcohol-alumina hydrate condensation products can be obtained in the form of shaped articles, e. g., films, fibers, and the like, or can be obtained for use as coating compositions, adhesives, and reinforcing binders for solid surfaces as in the preparation of laminated articles.

In one method of carrying out this invention, polyvinyl alcohol is dissolved in water to form a 10% aqueous solution and from 20–50% by weight, based on the polyvinyl alcohol, of colloidal alumina in an aqueous sol containing 3–10% of solid alumina is added to the polyvinyl alcohol solution with thorough mixing. A film is formed by flowing the mixture onto a glass plate and air-drying for 12 to 24 hours at room temperature and then baking for one hour at 100° C. The polyvinyl alcohol film containing the alumina retains its shape even after soaking for 16 hours in water at room temperature or after exposure to boiling water for 15 minutes.

In another method of carrying out this invention a 10% aqueous polyvinyl alcohol solution (viscosity 2000 C. P. at 70° F.) was mixed with an equal volume of alumina sol (4.6% $Al_2O_3$) to give a mixture of lower viscosity than the polyvinyl alcohol solution alone. The mixture was extruded in the form of a coarse fiber by forcing it from a spinneret apparatus into a bath containing an 0.2% aqueous sodium hydroxide solution; the fibers were dried for various periods from 5 minutes to 16 hours in an oven at 100° C., after which they were tested for water resistance. The fibers were not deformed or disintegrated by soaking for 4 hours in water at room temperature or in boiling water for 15 minutes. Polyvinyl alcohol (10% aqueous solution) diluted with water instead of alumina sol disintegrated immediately when introduced into 0.2% sodium hydroxide solution through the same apparatus and formed no shaped article.

When the alumina sol is mixed with the polyvinyl alcohol solution there is no evidence of coagulation or precipitation of either the polymer or the alumina. In employing a 10% aqueous solution of polyvinyl alcohol the viscosity of the mixture increases with increase in the amount of alumina ($Al_2O_3$), based on the weight of the polyvinyl alcohol, until at 50% alumina a very viscous mixture is obtained. With a 5% solution of polyvinyl alcohol up to 100% alumina by weight based on the polyvinyl alcohol can be used without objectionable increase in viscosity.

The colloidal alumina, which is usually employed as a 3–10% aqueous sol, can be prepared as described in U. S. Patents 1,775,640, 2,085,129, J. Phys. Chem. 35, 29 (1931) or J. Phys. Coll. Chem. 51, 768–70 (1947). In a preferred process, which is the subject of Bechtold and Stark application Serial No. 28,277, filed May 20, 1948, colloidal alumina hydrate is prepared from aluminum chloride by reaction with ammonium hydroxide, the precipitated alumina hydrate filtered and washed with water to remove excess ammonium chloride; the concentrate heated and then subjected to strong shearing forces. By this procedure the average size of all particles of colloidal alumina hydrate obtained is of the order of 30–60 millimicrons in diameter. If, after preparing the colloidal alumina hydrate sol, this composition is subjected to freezing by exposure to a temperature of less than 0° C., and then the composition is again melted by warming, a colloidal alumina hydrate sol of improved stability is obtained. This is disclosed and claimed in Stark application Serial No. 28,278, filed May 20, 1948.

This invention is further illustrated, but is not intended to be limited, by the following examples in which parts and percentages are by weight.

Example I

An alumina sol containing 5.8% aluminum oxide was added in varying proportions to a 10% solution of 86–89% hydrolyzed polyvinyl acetate having a viscosity of 1700 centipoises, as measured in 10% aqueous solution at 25° C. Films were formed by flowing the mixtures onto a glass plate, drying for 12 to 16 hours at room temperature, then baking for one hour at 100° C. The baked films were tested for water resistance (a) by allowing them to soak in water at room temperature for a period of time, and (b) by exposing them to boiling water. Polyvinyl alcohol films containing no colloidal alumina disintegrated in less than ten minutes in cold water and almost immediately in boiling water. Polyvinyl alcohol films containing 25–50% colloidal alumina were still intact after 20 hours in water at room temperature and were also still intact after a 15-minute treatment with boiling water. These results are tabulated as follows:

| Per Cent Al$_2$O$_3$ on Polyvinyl Alcohol (solid basis) | Water Solubility Air-dried | Water Solubility (Baked 100° C.) | Effect of Boiling Water on Baked Film |
|---|---|---|---|
| 0 | Dissolved in 5–10 min. | Disintegrated in 10 min. | Disintegrated almost immediately. |
| 10 | Disintegrated in 40 min. | Disintegrated in 50 min. | Partly disintegrated in 5–10 min. |
| 25 | Disintegrated in 60 min. | Film intact after 20 hours | Film intact at end of test, after 15 min. |
| 50 | Disintegrated in 90 min. | Film intact after 4 days | Film intact after 15 min. |

The polyvinyl alcohols employed in this invention are the water-soluble polyvinyl alcohols, i. e., water-soluble polymers containing a plurality of recurring

groups. These include polyvinyl alcohol prepared by the complete hydrolysis of a polyvinyl ester of a lower fatty acid, e. g., polyvinyl acetate, and water-soluble, partially hydrolyzed esters of polyvinyl alcohol with these acids. Included also are the water-soluble ethers and acetals of polyvinyl alcohol in which there are sufficient free hydroxyl groups to retain the water solubility of the polymer. Also included are the water-soluble, partially and completely hydrolyzed polyvinyl esters which are copolymers, e. g., copolymers of vinyl acetate with small amounts of ethylenically unsaturated compounds, for example, vinyl chloride, styrene, acrylic and methacrylic acids and esters, e. g., methyl acrylate and methyl methacrylate, and monoolefins, e. g., ethylene. The water-soluble, completely hydrolyzed ethylene/vinyl acetate copolymers of Roland U. S. Patent 2,386,347 can also be used.

Although not as satisfactory as a polyvinyl alcohol, other synthetic, water-soluble, high-molecular-weight, i. e., macromolecular, hydroxylated polymers can be converted to water-insoluble compositions using colloidal alumina hydrate by the same process as employed with polyvinyl alcohol. For example, films were prepared from compositions containing 10, 25 and 100% of alumina by weight based on water-soluble hydroxyethylcellulose and water-soluble methylcellulose, respectively, and were dried for one hour at 100° C. When these films were soaked in water at room temperature for 16 hours the film remained intact. A control film of the unmodified polymer completely dissolved. Furthermore, when similar films of hydroxyethylcellulose and methylcellulose containing 25 and 100% alumina were immersed in water which was then heated to boiling, the films remained intact. Likewise sodium carboxymethylstarch and sodium carboxymethylcellulose can be insolubilized in the same manner.

The films and shaped articles prepared in accordance with this invention are colorless and transparent and have greatly enhanced resistance to water over the initial polyvinyl alcohol. Furthermore, they have a markedly increased resistance to softening and discoloration by heat over the unmodified polyvinyl alcohol.

In preparing the shaped structures according to this invention, from 10–100% and preferably about 20–50% by weight of aluminum oxide in the form of an aqueous sol, based on the weight of the polyvinyl alcohol, can be used. If less than this amount of alumina is present in the compositions, there is insufficient insolubilization of the polymer to attain satisfactory water resistance, and, if more than the maximum amount indicated above is used, the films and shaped structures tend to lose transparency.

In preparing the insolubilized films from the alumina-polyvinyl alcohol compositions, drying, i. e., removal of water, preferably by baking or heating is an essential step. This is usually carried out conveniently at 100° C. for one hour, or can also be accomplished at room temperature for longer times. The baking or drying temperatures can be up to the decomposition temperature of the organic polymer or for briefer times, e. g., 2 minutes to ½ hour, depending on the temperature employed. It is preferable, however, to heat the shaped compositions to at least 75° C. for ½ hour or more since compositions so treated show improved water resistance.

The aqueous solutions of the polyvinyl alcohol can contain from 2–25% or more of the polymer by weight, depending on the viscosity of the solution, but usually a solution containing 5–10% by weight is found most suitable. The polyvinyl alcohol is usually a high-molecular-weight polymer having a molecular weight of more than 10,000 and a viscosity of from 300 to 3000 centipoises in a 10% aqueous solution at 25° C.

This invention can be used in the preparation of films, protective coatings and the like, or in the preparation of fibers which can be used in textile materials. These polyvinyl alcohol-alumina hydrate condensation products can also be used as adhesives.

In addition aqueous colloidal alumina can be used to convert polyvinyl alcohol yarn suitably hot drawn and relaxed from a material soluble in boiling water to one which is not only insoluble therein but shrinks 2% or less therein. The treatment is preferably carried out at elevated temperatures.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process for preparing water-insoluble shaped objects from a water-soluble polyvinyl alcohol wherein an aqueous solution of a polyvinyl alcohol containing 10–100%, by weight of the polyvinyl alcohol, of aluminum oxide in the form of an aqueous sol, is formed into a shaped object and the water is removed from the shaped object.

2. A process for preparing water-insoluble shaped objects from a water-soluble polyvinyl alcohol wherein an aqueous solution of a polyvinyl alcohol containing 10–100%, by weight of the polyvinyl alcohol, of aluminum oxide in the form of an aqueous sol, is formed into a shaped object, water is removed from the shaped object and the dried shaped object is heated at a temperature of at least 75° C. for at least half an hour.

3. A process for preparing water-insoluble shaped objects from a water-soluble polyvinyl alcohol wherein an aqueous solution of a polyvinyl alcohol containing 20–50%, by weight of the polyvinyl alcohol, of aluminum oxide in the form of an aqueous sol, is formed into a shaped object and the water is removed from the shaped object.

4. A process for preparing water-insoluble shaped objects from a water-soluble polyvinyl alcohol wherein an aqueous solution of a polyvinyl alcohol containing 20–50%, by weight of the polyvinyl alcohol, of aluminum oxide in the form of an aqueous sol, is formed into a shaped object, water is removed from the shaped object and the dried shaped object is heated at a temperature of at least 75° C. for at least half an hour.

5. A process for insolubilizing a water-soluble polyvinyl alcohol which comprises admixing an aqueous solution of a polyvinyl alcohol with 10–100%, by weight of the polyvinyl alcohol, of alumina in the form of an aqueous sol and removing the water from the mixture.

6. A process for insolubilizing a water-soluble polyvinyl alcohol which comprises admixing an aqueous solution of a polyvinyl alcohol with 10–100%, by weight of the polyvinyl alcohol, of alumina in the form of an aqueous sol, removing water from the mixture, and baking the dried alumina polyvinyl alcohol composition at at least 75° C. but below the decomposition temperature thereof for at least half an hour.

7. A shaped water-insoluble condensation product of a polyvinyl alcohol with 10–100% of its weight of alumina hydrate.

8. An aqueous solution of a polyvinyl alcohol containing 10–100%, by weight of said alcohol, of alumina hydrate in sol form.

9. A process for insolubilizing a water-soluble polyvinyl alcohol which comprises admixing an aqueous solution of a polyvinyl alcohol with 20–50%, by weight of the polyvinyl alcohol, of alumina in the form of an aqueous sol and removing the water from the mixture.

10. A process for insolubilizing a water-soluble polyvinyl alcohol which comprises admixing an aqueous solution of a polyvinyl alcohol with 20–50%, by weight of the polyvinyl alcohol, of alumina in the form of an aqueous sol, removing the water from the mixture, and baking the dried alumina polyvinyl alcohol composition at at least 75° C. but below the decomposition temperature thereof for at least half an hour.

GORDON DERBY PATTERSON.
HENRY MORONI STARK.

REFERENCES CITED

The following references are of record in the file of this patent:

UNITED STATES PATENTS

| Number | Name | Date |
|---|---|---|
| 1,629,161 | Herrmann et al. | May 17, 1927 |
| 2,162,618 | Izard | June 13, 1939 |
| 2,154,185 | Robie | Apr. 11, 1939 |
| 2,236,545 | Maxwell | Apr. 1, 1941 |
| 2,251,296 | Shipp | Aug. 5, 1941 |
| 2,337,628 | Schutze et al. | Dec. 28, 1943 |

OTHER REFERENCES

Wintgen et al., Kolloid Zeitschrift, vol. 47, 1929, pp. 104, 105, 112, 113.